UNITED STATES PATENT OFFICE.

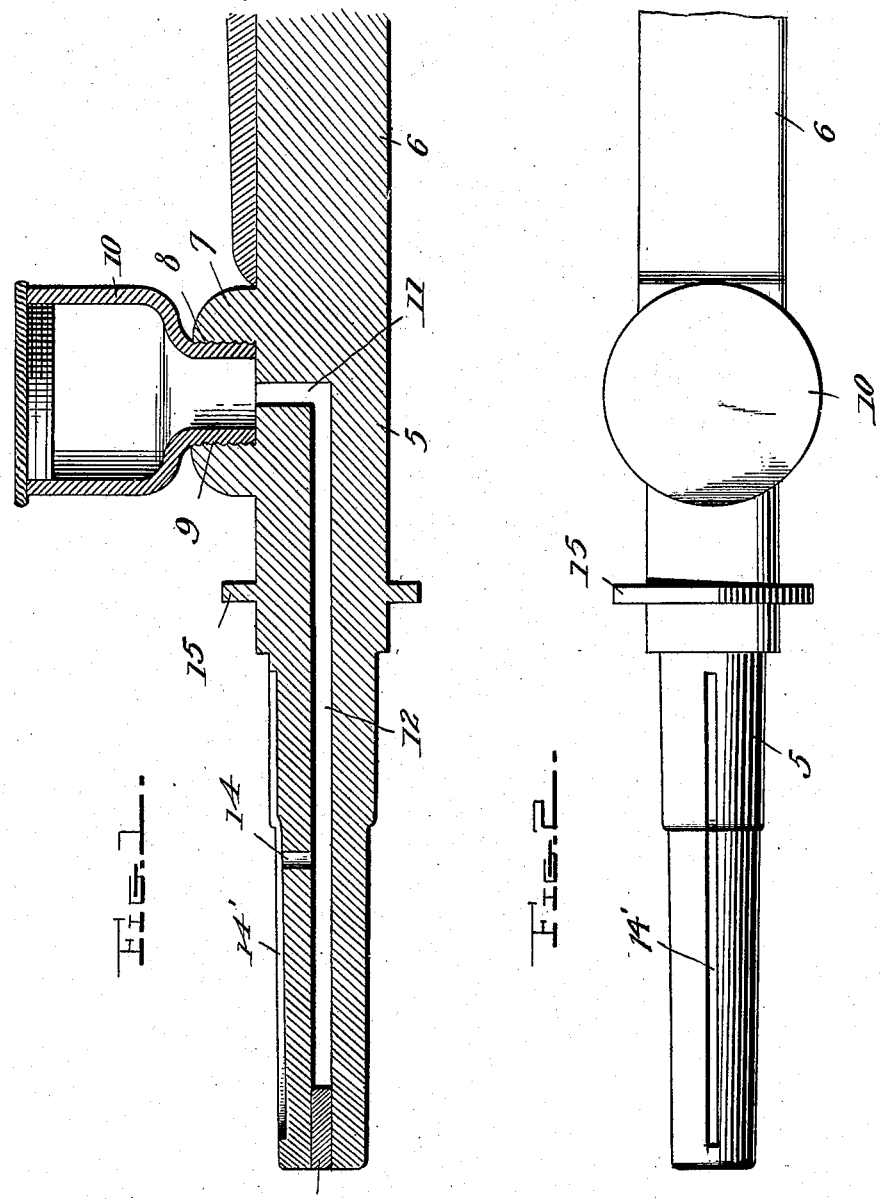

CLARENCE R. HONE, OF MAGNETIC SPRINGS, OHIO.

SPINDLE.

No. 900,928.   Specification of Letters Patent.   Patented Oct. 13, 1908.

Application filed April 30, 1907. Serial No. 371,195.

*To all whom it may concern:*

Be it known that I, CLARENCE R. HONE, a citizen of the United States, residing at Magnetic Springs, in the county of Union and State of Ohio, have invented certain new and useful Improvements in Spindles, of which the following is a specification.

This invention relates to vehicle spindles and more particularly to the lubrication thereof and has for its object to provide a spindle equipped with means for easily and efficiently lubricating it, another object being to provide a structure which may be easily incorporated in the spindle without excessive increase in the cost thereof.

In the drawings forming a portion of this specification and in which like numerals of reference indicate similar parts in the several views:—Figure 1 is a longitudinal section through a spindle formed in accordance with the present invention. Fig. 2 is a top plan.

Referring now to the drawings, there is shown a spindle 5 carried by an axle 6 and having upon its upper portion at its inner end, and adjacent to the axle a boss 7 in which there is formed a recess 8 opening through the upper face of the boss. The recess is internally threaded for the reception of the stem 9 of a grease-cup 10 which is removably engaged therein and a passage 11 is bored inwardly from the bottom of the recess 8 to communicate with the inner end of a central longitudinal passage 12, bored inwardly from the outer end of the spindle, the outer portion of this passage 12 being closed by a plug 13. A vertical passage 14 leads downwardly from the surface of the spindle between the ends thereof, to communicate with the central passage 12, and formed in the upper portion of the spindle, there is a longitudinally extending groove 14', which communicates with the passage 14. It will be seen that lubricant from the grease cup will flow into the groove 11, thence into the groove 12, through the passage 14 and into the groove 14', and from this groove 14' the lubricant will be distributed to the surface of the spindle.

The spindle is provided with a collar 15 located outwardly of the boss 7, and is thus arranged to limit the inward movement of a skein.

What is claimed is:

A device of the class described comprising a vehicle axle including a spindle therefor having an inner enlarged portion and an outer reduced portion, a skein engaging collar carried by the spindle, a boss carried by the axle and located upon the upper side thereof and disposed inwardly of the collar, the boss having a threaded passage formed therein, the spindle having a longitudinally extending passage opening outwardly at the outer end of the spindle, the spindle having a vertical passage in communication with the longitudinally extending passage and with the passage formed in the boss respectively, the reduced portion and the enlarged portion respectively of the spindle having alining grooves formed in their upper faces, the spindle having a vertical passage communicating with the longitudinally extending passage and with the groove formed in the reduced portion of the spindle respectively, a removable plug disposed in the longitudinally extending passage adjacent to the outer end of the spindle, and a grease cup having a threaded stem engaged in the passage formed in the boss, the grease cup being arranged in communication with the first named vertical passage formed in the spindle.

In testimony whereof I affix my signature, in presence of two witnesses.

CLARENCE R. HONE.

Witnesses:
EARL ELZEY,
R. C. TURNEY.